United States Patent
Feng et al.

(10) Patent No.: US 7,880,388 B2
(45) Date of Patent: Feb. 1, 2011

(54) EXTERNAL ELECTRODE FLUORESCENT LAMP HAVING CONDUCTIVE LAYER AND BACKLIGHT MODULE UTILIZING SAME

(75) Inventors: Sha Feng, Shenzhen (CN); Xiao-Hong Jing, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 187 days.

(21) Appl. No.: 12/290,791

(22) Filed: Nov. 3, 2008

(65) Prior Publication Data

US 2009/0115308 A1    May 7, 2009

(30) Foreign Application Priority Data

Nov. 2, 2007    (CN) .................... 2007 2 0170531

(51) Int. Cl.
*H01J 65/00* (2006.01)

(52) U.S. Cl. .................. 313/607; 313/234; 313/594

(58) Field of Classification Search ........... None
See application file for complete search history.

(56) References Cited

U.S. PATENT DOCUMENTS

| | | | |
|---|---|---|---|
| 7,121,683 B2 | 10/2006 | Teng et al. | |
| 7,638,945 B2 * | 12/2009 | Takata | 313/607 |
| 7,677,945 B2 * | 3/2010 | Skutsky et al. | 445/26 |
| 2006/0284560 A1 * | 12/2006 | Park et al. | 313/634 |
| 2008/0252193 A1 * | 10/2008 | Yamada et al. | 313/486 |
| 2010/0102705 A1 * | 4/2010 | Yun | 313/491 |

\* cited by examiner

*Primary Examiner*—Ashok Patel
(74) *Attorney, Agent, or Firm*—Wei Te Chung

(57) ABSTRACT

An exemplary external electrode fluorescent lamp includes a fluorescent tube having two electrodes fixed at two ends thereof, and two inner caps respectively holding the electrodes. Each inner cap includes an electrode receiving portion configured for receiving the electrode, a conductive layer provided at inner surfaces of the electrode receiving portion, a lead receiving portion integrally formed with the electrode receiving portion, and a conductive lead received in the lead receiving portion. The conductive layer contacts the conductive layer. A backlight module employing the external electrode fluorescent lamp is also provided.

20 Claims, 4 Drawing Sheets

EXTERNAL ELECTRODE FLUORESCENT LAMP HAVING CONDUCTIVE LAYER AND BACKLIGHT MODULE UTILIZING SAME

CROSS-REFERENCE TO RELATED APPLICATION

This application is related to, and claims the benefit of, a foreign priority application filed in China as Serial No. 200720170531.0 on Nov. 2, 2007. The related application is incorporated herein by reference.

FIELD OF THE DISCLOSURE

The present disclosure relates to an external electrode fluorescent lamp (EEFL) having an inside conductive layer therein, and a backlight module employing the EEFL.

GENERAL BACKGROUND

Liquid crystal displays are commonly used as display devices for compact electronic apparatuses, not only because they provide good quality images but also because they are very thin. Liquid crystal in a liquid crystal display does not emit any light itself. The liquid crystal requires a light source so as to be able to clearly and sharply display text and images. Therefore, a typical liquid crystal display requires an accompanying backlight module.

Referring to FIG. 6, a typical backlight module 1 includes a diffusing film 130, a plurality of EEFLs 110, and a reflective film 120 arranged in that order from top to bottom. Each EEFL 110 includes a linear main body 112, two electrodes 114 arranged at two opposite ends thereof, and two conductive wires (not labeled) connected to the electrodes 114, respectively. The conductive wires are generally connected to the electrodes 114 by a soldering method, which is generally time-consuming. Moreover, the soldered conductive wires are liable to fall off from the electrodes 114 in normal uses, which may result in a poor reliability of the EEFL 110 and the corresponding backlight module 1.

What is needed, therefore, is an EEFL that can overcome the described limitations, as well as a backlight module employing the EEFL.

SUMMARY

In an exemplary embodiment, a external electrode fluorescent lamp includes a fluorescent tube having two electrodes fixed at two ends thereof, and two inner caps respectively holding the electrodes. Each inner cap includes an electrode receiving portion configured (i.e., structured and arranged) for receiving the electrode, a conductive layer provided at inner surfaces of the electrode receiving portion, a lead receiving portion integrally formed with the electrode receiving portion, and a conductive lead received in the lead receiving portion. The conductive layer contacts the conductive layer. A backlight module employing the external electrode fluorescent lamp is also provided.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
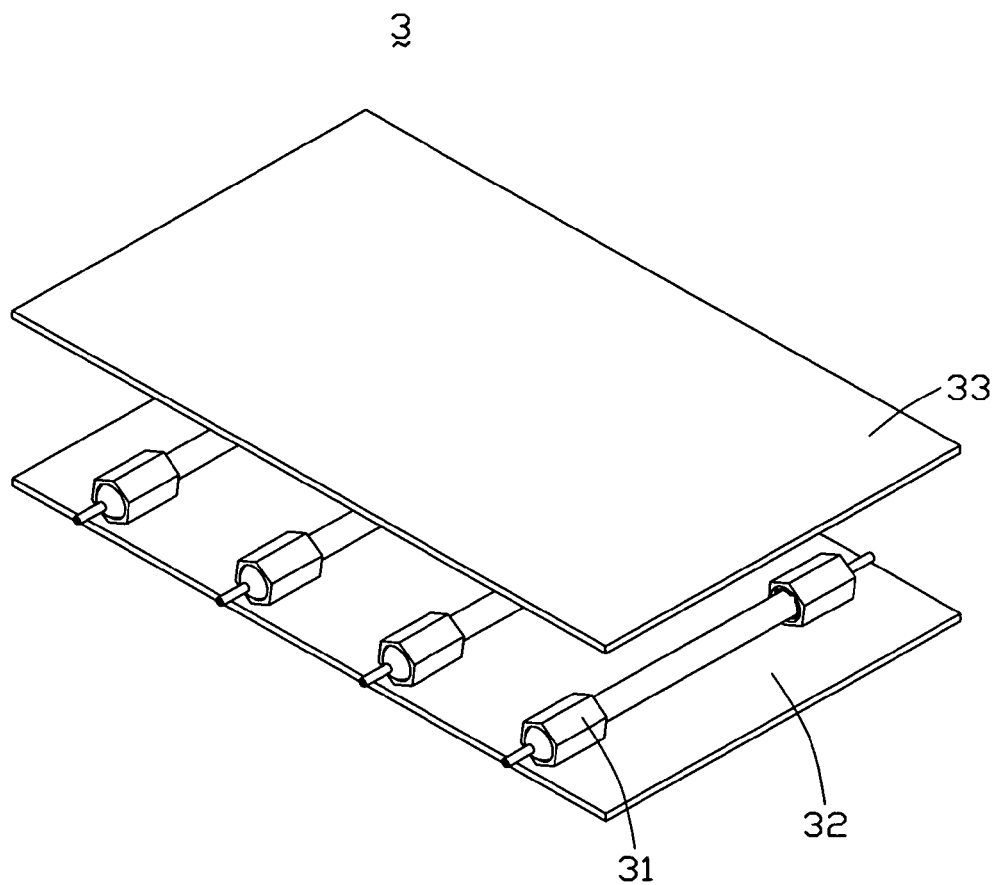
FIG. 1 is an exploded, isometric view of a backlight module according to an exemplary embodiment of the present disclosure, the backlight module including a plurality of EEFLs.

Referring to FIG. 1, a backlight module according to an exemplary embodiment of the present disclosure is shown. The backlight module 3 includes a diffusing film 33, a plurality of EEFLs 31, and a reflective film 32 arranged in that order from top to bottom.

Figure 2:
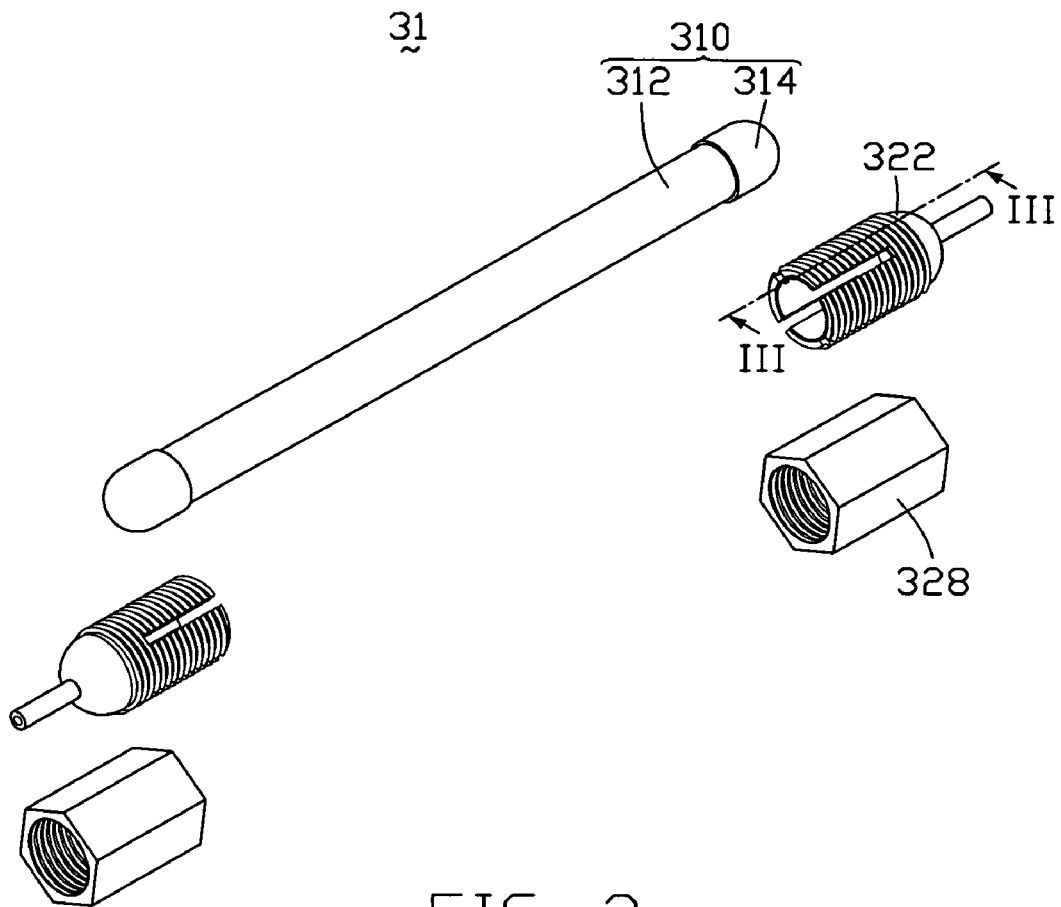
FIG. 2 is an isometric, enlarged view of the EEFL of FIG. 1, each EEFL having a pair of inner caps and a pair of outer caps.

Referring to FIG. 2, each EEFL 31 includes a hermetically-sealed florescent tube 310, a pair of inner caps 322, and a pair of outer caps 328. The tube 310 includes a pair of electrodes 314 fixed at two opposite ends thereof, a plurality of discharging gas (invisible) sealed therein, and a florescent layer (not shown) formed on inner surfaces thereof.

Figure 3:
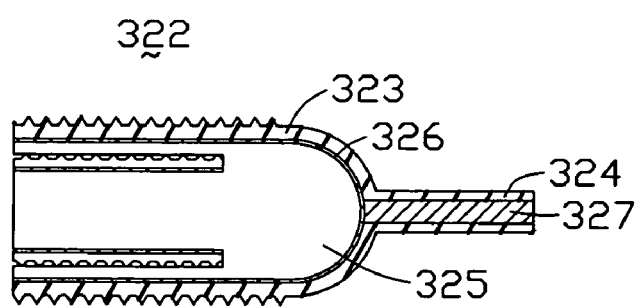
FIG. 3 is a side, cross-sectional view taken along line III-III of FIG. 2.

The inner cap 322 is elastically deformable and insulated, and includes a plurality of screw threads (not labeled) on outer surfaces thereof. Referring also to FIG. 3, the inner cap 322 includes an electrode receiving portion 323, and a lead receiving portion 324 integrally formed with the electrode receiving portion 323. In the illustrated embodiment, the electrode receiving portion 323 has a substantially U-shaped profile, and defines a receiving space 325 for receiving the electrode 314. The electrode receiving portion 323 has a constant inside diameter since an opening (not labeled) thereof to portions adjacent to a bottom thereof, and further defines four parallel gaps (not labeled) therein. The gaps extend from an opening of the electrode receiving portion 323, and stop at portions adjacent to the lead receiving portion 324. Inner surfaces of the electrode receiving portion 323 are coated with a conductive layer 326. The lead receiving portion 324 outwardly extends from a bottommost extremity of the electrode receiving portion 323, and defines another space for receiving a conductive lead 327 therein. The conductive lead 327 contacts the conductive layer 326.

The outer cap 328 includes a plurality of screw threads on inner surfaces thereof. An inside diameter of the outer cap 328 is slightly less than an outside diameter of the inner cap 322. The outer cap 328 is configured to be threadingly engaged to the inner cap 322.

Figure 4:
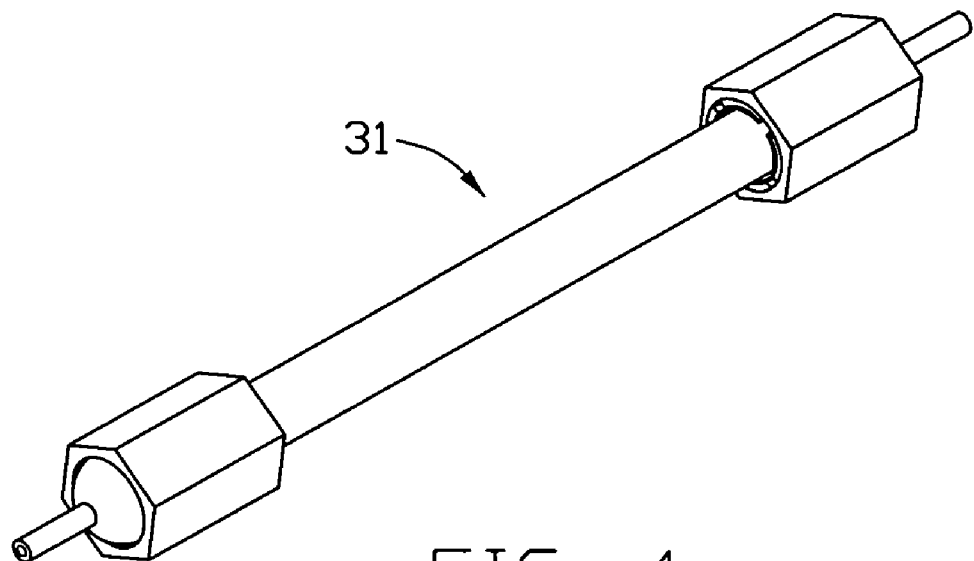
FIG. 4 is an assembled view of the EEFL of FIG. 2.

Referring also to FIG. 4, in operation of assembling the EEFL 31, the electrodes 314 are respectively inserted into the electrode receiving portions 323 of the inner caps 322, and the outer caps 328 are then threadingly engaged to the inner caps 322. Because the inside diameter of the outer cap 328 is slightly less than the outside diameter of the inner cap 322, the inner cap 322 deformably contacts the respective electrode 314. Therefore, the electrode 314 is electrically connected to the conductive lead 327 via the conductive layer 326.

In summary, the electrode 314 can be conveniently received in the inner cap 322, and be electrically connected to the conductive lead 327 via the conductive layer 326. Therefore, the EEFL 31 is easily to be assembled. Further, there is no need of time-consuming steps for soldering conductive wires to the electrodes 314, and the conductive leads 327 can be avoided from falling off from the electrodes 314, which improves the reliability of the EEFL 31 and the corresponding backlight module 3.

Figure 5:
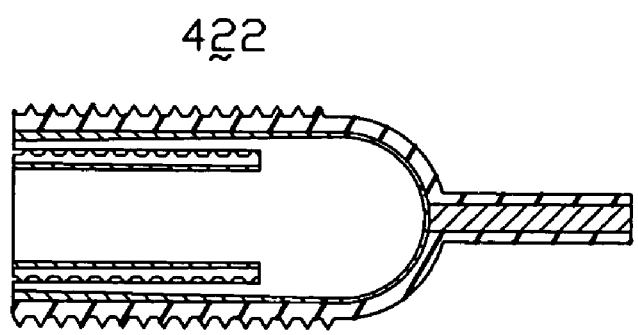
FIG. 5 is similar to FIG. 3, but showing a corresponding view in case of an alternative inner cap.
Figure 6:
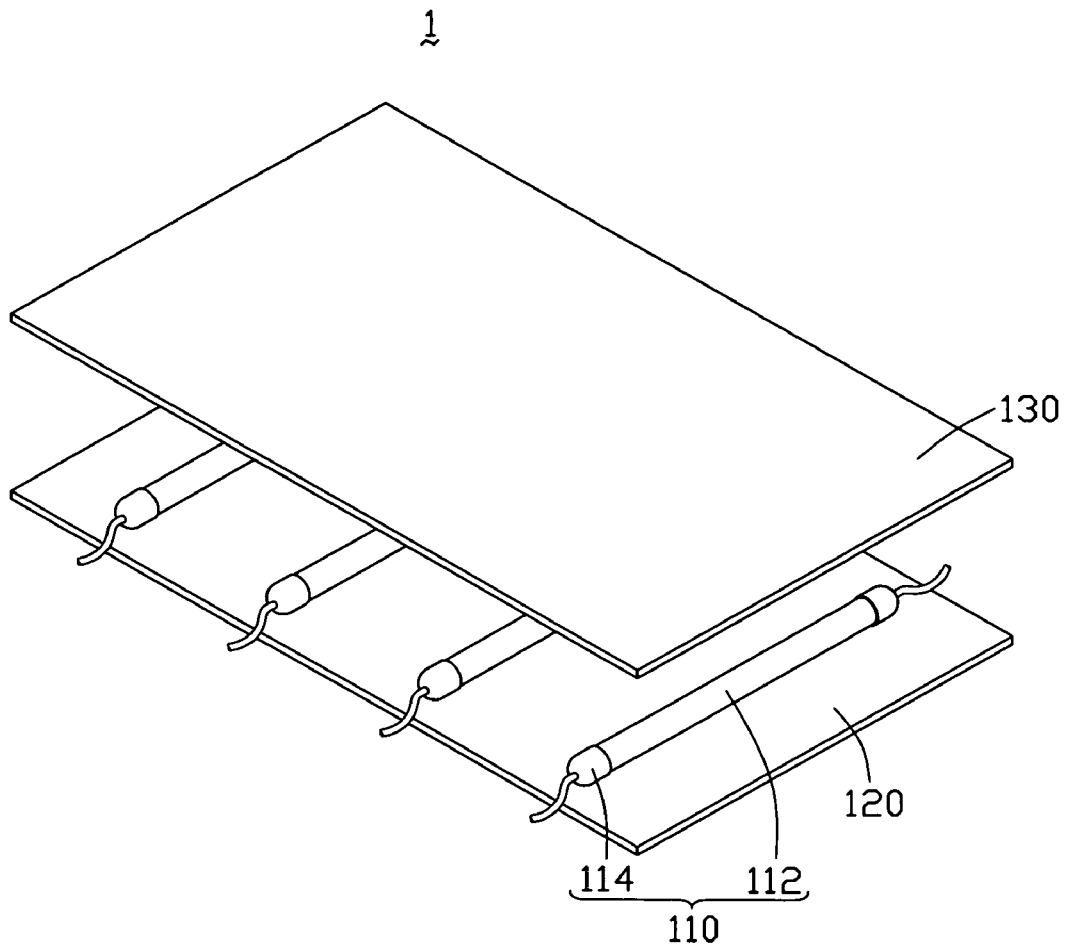
FIG. 6 is an exploded, isometric view of a conventional backlight module.

Further or alternative embodiments may include the following. In one example, an inside diameter of an electrode receiving portion progressively increases from an opening thereof to portions adjacent to a bottom thereof, as is shown in FIG. 5. Thereby, the electrode 314 can be further reliably held by the inner cap 422.

It is believed that the present embodiments and their advantages will be understood from the foregoing description, and it will be apparent that various changes may be made thereto without departing from the spirit or scope of the disclosure or sacrificing all of its material advantages, the examples hereinbefore described merely being preferred or exemplary embodiments of the disclosure.

What is claimed is:

1. An external electrode fluorescent lamp (EEFL) comprising:
   a fluorescent tube having two electrodes fixed at two ends thereof; and
   two inner caps respectively holding the electrodes, each inner cap comprising:
   an electrode receiving portion configured for receiving the electrode;
   a conductive layer provided at inner surfaces of the electrode receiving portion;
   a lead receiving portion integrally formed with the electrode receiving portion;
   a conductive lead received in the lead receiving portion, and contacting the conductive layer; and
   two outer caps each comprising a plurality of screw threads on inner surfaces so as to allow threadingly engaging the outer cap to the respective inner cap.

2. The EEFL of claim 1, wherein the inner cap comprises a plurality screw threads on outer surfaces thereof.

3. The EEFL of claim 1, wherein the electrode receiving portion defines a plurality of gaps therein.

4. The EEFL of claim 3, wherein the gaps extend from an opening of the electrode receiving portion, and stop at portions adjacent to the lead receiving portion.

5. The EEFL of claim 1, wherein the lead receiving portion outwardly extends from a bottommost extremity of the electrode receiving portion.

6. The EEFL of claim 1, wherein the inner cap is insulated.

7. The EEFL of claim 1, wherein an inside diameter of the outer cap is slightly less than an outside diameter of the inner cap.

8. The EEFL of claim 1, wherein an inside diameter of the electrode receiving portion progressively increases from an opening thereof to portions adjacent the lead receiving portion.

9. The EEFL of claim 1, wherein an inside diameter of the electrode receiving portion from an opening thereof to portions adjacent the lead receiving portion is constant.

10. The EEFL of claim 1, wherein the inner cap is elastically deformable.

11. A backlight module comprising:
    an external electrode fluorescent lamp (EEFL) comprising:
    a fluorescent tube having two electrodes fixed at two ends thereof; and
    two inner caps respectively holding the electrodes, each inner cap comprising:
    an electrode receiving portion configured for receiving the electrode;
    a conductive layer provided at inner surfaces of the electrode receiving portion;
    a lead receiving portion integrally formed with the electrode receiving portion;
    a conductive lead received in the lead receiving portion, and contacting the conductive layer; and
    two outer caps each comprising a plurality of screw threads on inner surfaces so as to allow threadingly engaging the outer cap to the respective inner cap.

12. The backlight module of claim 11, wherein the inner cap comprises a plurality screw threads on outer surfaces thereof.

13. The backlight module of claim 11, wherein the electrode receiving portion defines a plurality of gaps therein.

14. The backlight module of claim 13, wherein the gaps extend from an opening of the electrode receiving portion, and stop at portions adjacent to the lead receiving portion.

15. The backlight module of claim 11, wherein the lead receiving portion outwardly extends from a bottommost extremity of the electrode receiving portion.

16. The EEFL of claim 11, wherein the inner cap is insulated.

17. The backlight module of claim 11, wherein an inside diameter of the outer cap is slightly less than an outside diameter of the inner cap.

18. The backlight module of claim 11, wherein the inner cap is elastically deformable.

19. An external electrode fluorescent lamp (EEFL) comprising:
    a fluorescent tube having an electrode fixed at one end thereof; and
    an inner cap holding the electrode, the inner cap comprising:
    an electrode receiving portion configured for receiving the electrode;
    a conductive layer provided at inner surfaces of the electrode receiving portion;
    a lead receiving portion integrally formed with the electrode receiving portion;
    a conductive lead received in the lead receiving portion, and contacting the conductive layer; and
    an outer cap threadingly engaging to the respective inner cap.

20. The EEFL of claim 19, wherein the inner cap is elastically deformable and insulated.

* * * * *